Sept. 2, 1941.     W. D. FOSTER     2,254,605
SPINDLE MOUNTING FOR CARRIERS
Filed Nov. 2, 1938      3 Sheets-Sheet 1
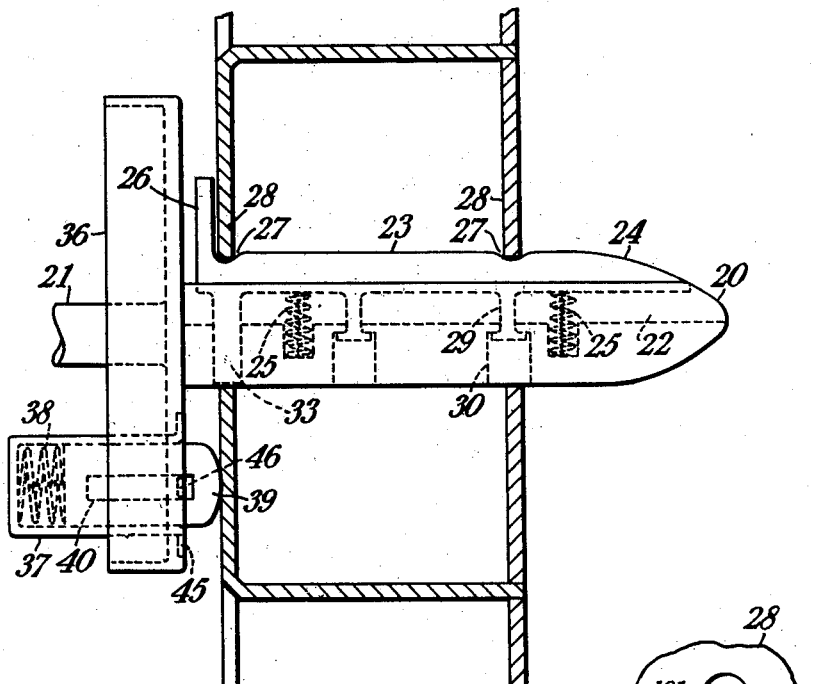
Fig. 1
Fig. 5
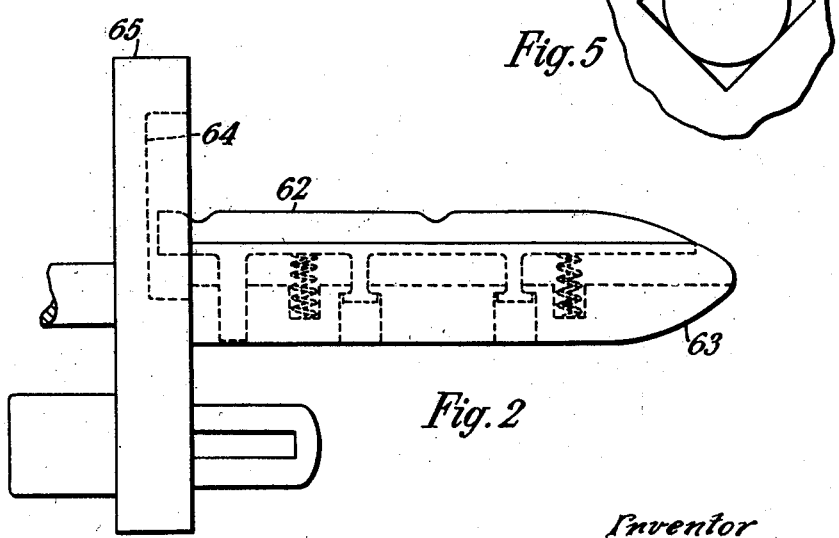
Fig. 2
Inventor

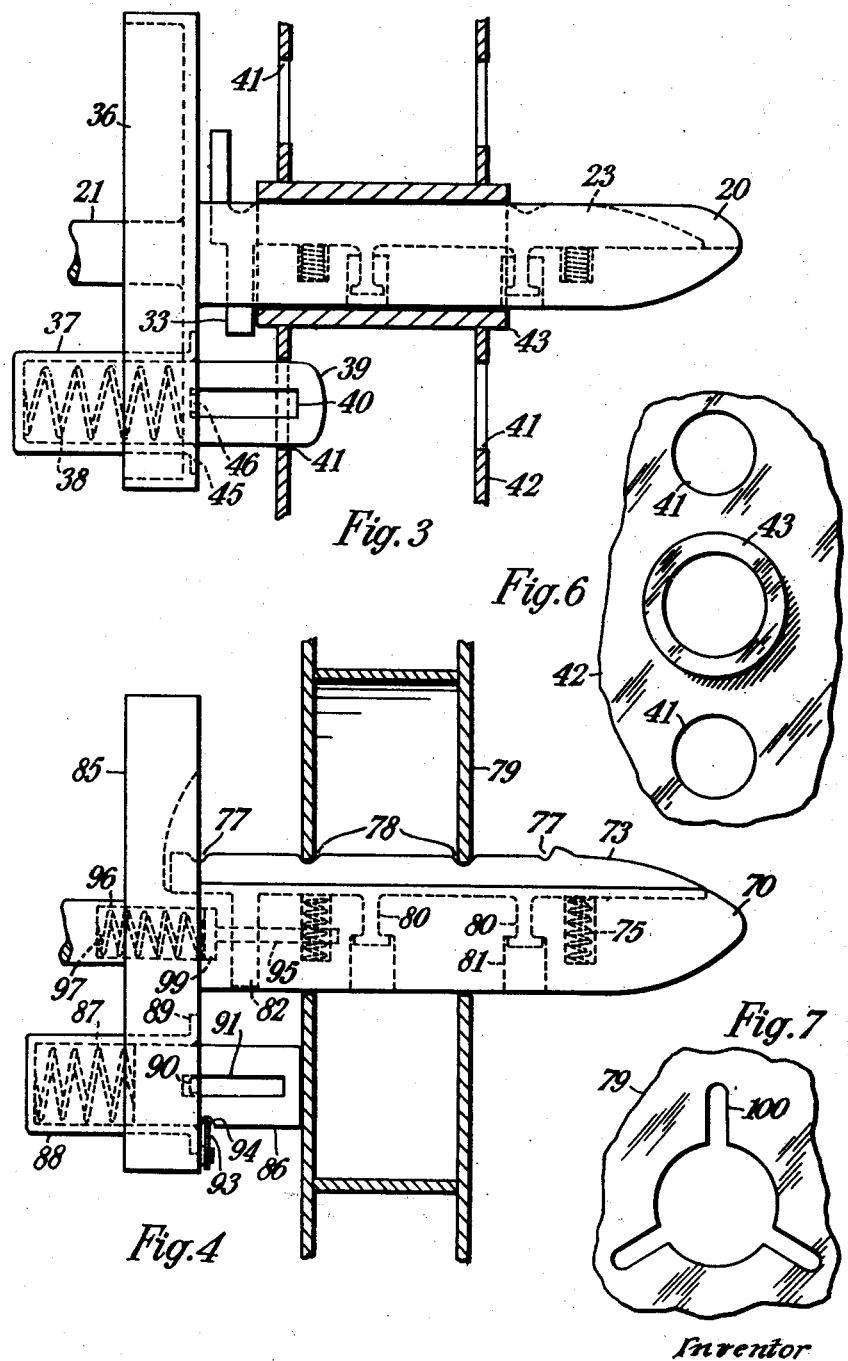

Sept. 2, 1941.  W. D. FOSTER  2,254,605
SPINDLE MOUNTING FOR CARRIERS
Filed Nov. 2, 1938  3 Sheets-Sheet 3
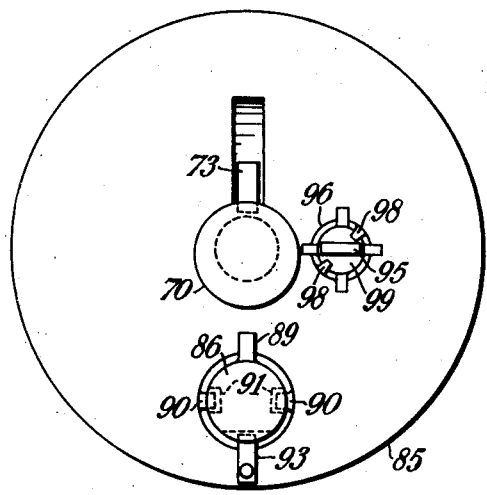
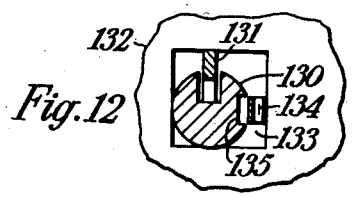
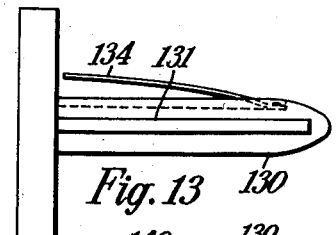
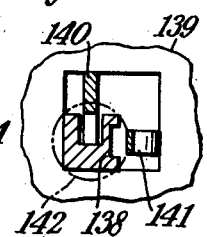
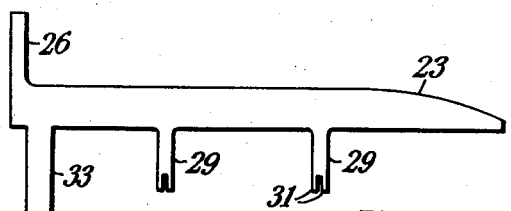
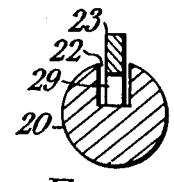
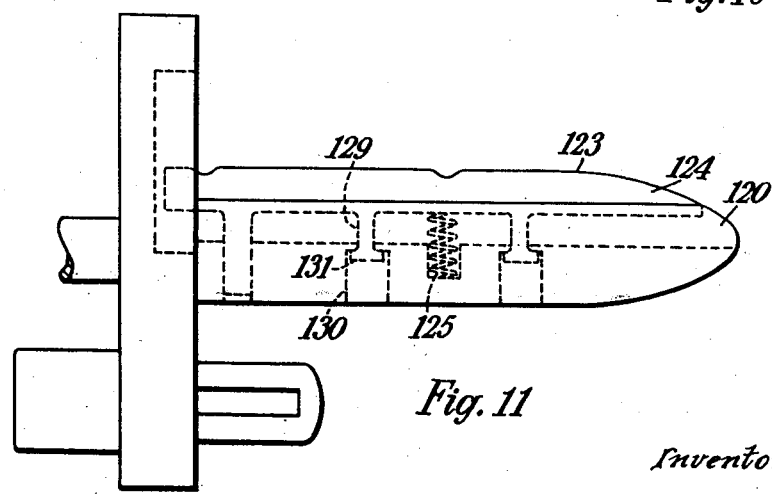
Inventor Patented Sept. 2, 1941

2,254,605

UNITED STATES PATENT OFFICE 2,254,605

SPINDLE MOUNTING FOR CARRIERS

Warren Dunham Foster, Washington Township, Bergen County, N. J.

Application November 2, 1938, Serial No. 238,406
In Great Britain November 3, 1937

20 Claims. (Cl. 242—70)

The present invention relates broadly to spindle mountings for spools or other carriers for winding and reeling any comparatively light ribbon or thread-like material and more particularly to spindles for mounting spools or carriers adapted either for delivering or receiving films in connection with photographic, projecting, printing, sound recording, sound reproducing or other apparatus in which it is desirable to pass a film or ribbon from one carrier or spool to another. It is often desirable or necessary to handle in one apparatus films, ribbons or tapes of different widths. Spools upon which such ribbons of different widths are wound are often supplied by various manufacturers and often have bores or spindle receiving openings of different diameter. Also such spools must be positioned at different points along the spindle in order that the films of different widths may engage with the other parts of the apparatus without being twisted. A primary purpose of the present invention is to supply a spindle of such characteristics that spools of different bores and/or accommodating ribbons or films of different widths may be selectively seated thereon in effective driven relation thereto and/or in proper relation to the path of the material through the apparatus by the mere act of assembly and without any especial adjustment or other manipulation.

In the kinematographic art, for example, at the present time there are in common use films of various widths, notably, 35, 17.5, 16, 9.5 and 8 millimetres, and from time to time proposals have been and experimental films produced of much greater width. Particularly in the field of amateur kinematography, which includes films of 16 millimetres and less in width, there is great demand for apparatus which will expose or project selectively films of 16 and 9.5 millimetres in width or of 16 and 8 millimetres in width or of all three of such widths. Many types of apparatus are upon the market which selectively accommodate films of these varying widths. In order to adapt these various types of apparatus to such films various changes are made in respect to the gate and sprockets and in the intermittent feeding member. With such changes the present invention is not concerned. Such apparatus, however, in order to be adapted for films of various widths, requires spindles of different diameters and also with means for positioning the spool at different points along the axis of the spindle. For example, the bore diameter of spools now commonly in use for the accommodation of 16 millimetre films is markedly different from that of such spools for the accommodation of films of 9.5 millimetres in width. Moreover in view of the necessity or at least the great desirability of feeding the film without twisting, that is to say without lateral displacement, it is necessary to pass a 9.5 millimetre film from a different point along the axis of the spindle than that at which a 16 millimetre film for example is positioned. To meet the above needs so far as known to me all apparatus at present in use which is adapted to films of different widths, employs different and interchangeable spindles or has an independent track for films of each width, or provides separate sleeves which may be manually placed upon and removed from the spindles in order to accommodate spools of various types. Such separate pieces are likely to cause difficulties, particularly with amateur users, and are likely to be mislaid. When the user wishes to expose or project a 9.5 millimetre film for example after having exposed or projected a film of 16 millimetres, he bodily removes the spindles adapted for the 16 millimetre film and fastens into place other spindles adapted for use with spools of smaller bore and requiring different axial positioning suitable for films of 9.5 millimetres in width. Or, if he has apparatus of the type in which two separate tracks are employed, he makes certain manual adjustments upon spindles which are adapted to accommodate spools of different characteristics but at entirely different places along their axes.

Such manipulation particularly for the amateur is troublesome. Also almost all of such apparatus requires the user to keep spare parts which are likely to become lost or mislaid.

A chief object of the present invention is to supply a spindle suitable for amateur kinematography upon which there may be selectively positioned spools having bores of different diameters and/or also having different requirements as to axial positioning. Another and related object is to supply such spindles which will selectively accommodate such differing spools of the types now in common commercial use. On apparatus employing spindles fashioned according to this invention for example the user may place a 16 millimetre spool upon the spindle and by that mere act without any attention whatever on his part the spool is held in proper driven relation to the spindle and in proper positioned relation to the path of the film through the apparatus. The user thereupon may slide such a 16 millimetre spool off the spindle and immediately slide thereupon the spool adapted to accommodate a film of 9.5 millimetre width. This spool is automatically positioned in a different relation to the path of the film than was the previous wider 16 millimetre spool and in spite of the fact that it may have a bore of smaller diameter is automatically positioned in proper driven contact therewith. Similarly, common types of 8 millimetre spools may be selectively and automatically assembled with the one spindle.

It will therefore be seen that by the employment of this invention it is possible to supply an apparatus in which is permanently mounted one set of spindles which will selectively and automatically accommodate spools of different characteristics.

It is obviously possible to employ this invention in any art in which relatively light films or ribbons of different widths are selectively wound or unwound.

Other advantages and characteristics of the present invention are apparent in the following description, the attached drawings, and the subjoined claims. Although I am showing one preferred embodiment of my invention, it will be readily understood that I am not limited to any particular construction as changes can readily be made without departing from the spirit of my invention or the scope of my broader claims.

The present invention is illustrated by way of example by the accompanying drawings, in which:

Fig. 1 is a side elevation partly in section of one form of practising the invention and showing a spool of relatively large bore and for relatively wide film, as for example 16 millimetres, in operative engagement on a spindle.

Fig. 2 is a similar view of a modified form of the invention.

Fig. 3 is a view corresponding to Fig. 1 and showing the same spindle but in use with a relatively narrow spool, as for example 9.5 millimetres and of relatively small bore.

Fig. 4 corresponds to Fig. 2 and shows a similar spindle in use with a spool of relatively very narrow width, as for example 8 millimetres, but of a bore of the same size as that of the spool shown in Fig. 1.

Fig. 5 is a side view of the central portion of a spool of the type shown in Fig. 1.

Fig. 6 is a side view of the central portion of a spool of the type shown in Fig. 3.

Fig. 7 is a side view of the central portion of a spool of the type shown in Fig. 4.

Fig. 8 is an end view corresponding to Fig. 4 looking from the spool side with the spool omitted.

Fig. 9 is a detailed view of a compensating element of the type shown in Figs. 1, 3 and 4.

Fig. 10 is a cross section showing the compensating element in a spindle.

Fig. 11 is a side view showing an alternative detail construction of the spindle and compensating element.

Fig. 12 is a fragmentary side view partly in section of the central portion of a spool on a spindle showing an alternative construction.

Fig. 13 is a plan view of the spindle of Fig. 12, shown on a small scale.

Fig. 14 is a view similar to Fig. 12 showing a slightly different construction from that illustrated in Figs. 12 and 13.

Referring to Fig. 1:

A spindle 20, which may be driven or idling, is formed upon or attached to a journalled shaft 21 and has a longitudinally extending radial slot 22 milled or otherwise formed therein which slot receives an elongated compensating latch 23 with a bevelled nose portion 24, the latch 23 being normally urged away from the spindle 20 by means of springs 25 positioned in appropriate pockets formed in the spindle 20. The latch 23 is provided with a terminal projection 26 extending at right angles to the main body portion and radially to the spindle and adapted to act as an inward stop for a spool which is to be mounted thereupon. The latch is also provided at suitable points with notches 27 adapted to seat the side walls 28 of a spool as indicated in section. It will be apparent that the different ends of the latch may move outwardly for various radial distances and thereby compensate for differences in diameter between the openings in either or both of the spool walls and the outer diameter of the mount portion of the spindle. The bevelled nose 24 makes easy the engagement of a spool thereupon. Headed studs 29 retained by their heads in recesses 30 maintain the latch in assembled relation to the spindle.

Reference is made to Figs. 9 and 10 for the details of construction of the latch as such.

In order to provide relatively cheap construction the latch 23 may be die cast and the spindle made upon a screw machine. The two studs 29 may be cast with split outwardly extending ends 31 (shown in Fig. 9) which after the latch is placed in position in the spindle are spread with an appropriate tool thus making the assembly very inexpensive.

Extending laterally from the latch and adapted to pass through an appropriate radial opening in the spindle is a positioning element 33 which as will be readily seen from Fig. 3 forms an inward stop for a spool of small bore and adapted to accommodate a narrow film. Formed with or attached to the spindle 20 and consequently rotatable therewith is a disc 36. Mounted upon this disc is a cup 37 containing a relatively weak coiled spring 38 and a driving pin 39. Diametrally opposite positioning slots 40 are formed in the outer surface of the pin. The pin is preferably a die casting. The spring presses the pin to the right as seen in the drawings for engagement in opening 41 of spool sides 42 of a small spool the center portion of which is shown by way of example in Fig. 6. This small spool is shown as including a bored spindle-receiving bearing 43 to which are attached the sides 42.

In order to secure inexpensive assembly the cup 37 may be provided with a plurality of ears 45 which may be passed through appropriate openings in the disc 36 and turned over and fastened thereto after the spring 38 and pin 39 have been placed in position. Other shorter ears 46 are turned inwardly after assembly and coact with the bottom of the positioning slots 40 to prevent the pin from leaving the cup. The operation of the device will be apparent from the foregoing description.

When the user wishes to employ the spool shown in Figs. 1 and 5, he pushes it over the end of the spindle. It slightly depresses the latch 23 as the periphery of the spindle-receiving opening of the spool slides into position over the nose 24. The inner side of the spool abuts against the stop 26 and the springs 25 coact with the notches 27 to hold the spool in firm driven relation to the spindle. The side of the spool presses against the pin 39 and forces it against the spring 38 out of the way and into the position shown in Fig. 1. The pressure of the end of the pin 39 against the spool side assists to hold the spool in position but is not necessary. The spool illustrated by Fig. 5 has in one of the sides 28 a plain circular aperture and in the other side a square aperture having a notch 101 at one corner thereof.

To remove the spool the user merely pulls it off. When the user wishes to use a type of spool shown in Figs. 3 and 6, he pushes it over the end of the spindle 20 thereby completely depressing the latch 23 to a position within the periphery of the spindle 20. By this act, however, the stop 33 is forced downwardly as viewed in Fig. 3 to a position wherein it acts as a stop to the spool by its engagement with the inner end of the bearing 43. The pin 39 under the influence of the spring 38 is projected through the opening 41 and forms the driving connection. The sides of such a spool are furnished with a plurality of such openings 41 and by turning the spool upon the spindle the user brings the nearest one opposite the driving pin. This movement is the same as that which must be employed in the conventional type of spindle which is now furnished for use with spools of this kind. After the film has been wound or unwound the user pulls the spool off and is ready to replace it with another spool of different characteristics.

In the modification shown in Fig. 2 a latch 62 coacting with a spindle 63 does not carry the stop for the widest spool but is extended to the left as viewed in the figure to a position within an opening 64 formed in a disc 65 which rotates with the spindle. It will thus be seen that the disc 65 operates as a stop for a spool of large size. In all other particulars this latch is constructed as the one shown in Fig. 1 and described above. Such latch per se is known being described and claimed per se in the United States Patent Number 1,871,230 issued August 9, 1932, upon the application of C. U. Bundick and myself, but not in combination with means for limiting the inward movement of a spool of smaller diameter.

As is shown by way of illustration in Figs. 4 and 8, a spindle made according to this construction permits more than two different types of spools to be used.

Fig. 4 shows by way of further illustration a spool for still narrower films, as for example of 8 millimetres in width, applied to a spindle 70. A latch 73 constructed as previously described in connection with Fig. 2 is normally urged away from the spindle by means of springs 75. Notches 77 seat the sides of a 16 millimetre or other wide spool not shown and notches 78 seat the sides 79 of the narrow spool which appears in the drawings. If desired, the outer notch 77 may be made slightly more pronounced in order to aid the operator in differentiating between the positions for the spools of different sizes, or the inner one of the notches 78 may be so distinguished. Headed studs 80 extending into recesses 81 hold the latch in assembled relation with the spindle. A positioning stop 82, extensible below the spindle to coact with a spool of intermediate size such as one to accommodate films of 9.5 millimetres in width, is shown as held within the periphery of the spindle by the coaction of the bore of the spool and the springs 75. Fast with the spindle 70 is a disc 85, which is in the form of the invention shown in Fig. 2 and acts as an inward stop for a spool to accommodate films of the largest width. A driving pin 86 urged to the right as viewed in Fig. 4 by a spring 87 within a cup 88 is adapted to form a driving connection with a spool of intermediate size. Ears 89 cut in the top of the cup 88 are turned outwardly to fasten the cup to the disc 85 and ears 90 are turned inwardly to cooperate with the lower end of slots 91 to limit the outward movement of the pin 86. A latch or detent spring 93 engaging a notch 94 assists the notches 78 in giving an indication to the user of the position of the smallest spool along the axis of the spindle. In order to form a driving connection with this spool a flat driving pin 95 may be mounted much as is the driving pin 86. A cup 96, likewise mounted upon the disc 85 and extending to the left from its right hand surface as viewed in Fig. 4, contains a spring 97, which forces this pin 95 outwardly until the ears 98 contact with the base 99 of the pin 95. To drive the spool the pin 95 enters one of three radial openings 100 formed 120° apart in the side 79 of the spool shown in Fig. 7.

The operation of the above spindle will be clear from the foregoing. As the user pushes a 16 millimetre or other wide spool over the end of spindle 70 the inner periphery of the bore rides over the latch 73 until the inner side of the spool fits snugly against the side of the disc 85. It will be understood that the springs of the driving pins 86 and 95 are relatively weak so that the pins may be readily depressed to an inoperative position. Many spools, however, on the market for 16 millimetre films have side plates formed with a slot, such as the notch 101 shows in Fig. 5, with which the pin 95 may coact. When such spools are used it will of course be understood that pin 95 passes into such an opening and assists in making the driving connection. When a spool of intermediate size is used, for example one such as shown in Fig. 6 appropriate for a film of 9.5 millimetres in width, its relatively small bore will completely compress the latch 73 and the positioning stop or element 82 will be operative and the driving pin 95 will be forced to the left and out of the way. The pin 86 will enter an opening 41 and drive the spool.

When the smallest spool is used, as, for example, one such as is shown in Fig. 7 to accommodate a film of 8 millimetres in width, the spool sides find the seats 78 and the user rotates the spool sufficiently so that the driving pin 95 finds an appropriate opening 100. The latch or detent 93 holds the driving pin 86 in the position shown in Fig. 4 where it may be useful largely as a signalling device to the user that he has pushed the spool sufficiently far.

In all forms of the invention it is desirable to balance the discs 36, 65 and 85.

It will be understood that with spools of one bore the movement of the spindle will be slightly eccentric. As a practical matter, however, this eccentricity is too slight to be of any disadvantage. In case the spindle is applied to accommodate spools for films of 16, 9.5 and 8 millimetres in width the center of rotation is best arranged for the 16 and 8 millimetre spools since these spools have bores of the same diameter and since a 16 millimetre spool carries the largest weight of material.

In Fig. 11 is illustrated a modified construction of a latch and mounting therefor which may be applied to all forms of the invention. Upon a spindle 120 a compensating latch 123 with a bevelled nose portion 124 is mounted. A single spring 125 normally urges the latch away from the spindle. Headed studs 129 are maintained in recesses 130 by heads 131. These recesses are slightly relieved so that the whole latch mechanism may readily tilt as the spool is being placed upon the spindle. In other respects the construction and operation of this form of the invention are the same as shown in the other figures. It will be readily understood that the single central resilient support which is described above will materially aid in the insertion of the spool and will prevent binding. It will be understood by those skilled in the art that the radial opening for the axial positioning elements 33 and 82 will be sufficiently relieved to prevent binding when the compensating latch is tilted or rocked.

It will be readily understood that a spindle mounting portion which is circular in cross section will satisfactorily support a spool which has a square opening provided that there is a three-point contact between the periphery of the spindle and the spindle receiving opening of the spool. It is very desirable when spindles constructed according to this invention are to be used with spools with square openings which are larger than the cross sectional area of the spindle to provide means to ensure such three-point contact.

In Figs. 12 and 13 a spindle 130 of circular cross section with a compensating latch 131 is employed with a spool 132 having a square spindle-receiving opening 133. A long leaf spring 134 is fastened by one end only thereof in the outer end of a longitudinal slot 135 in the spindle and extends along the spindle inwardly towards the apparatus in alignment with but normally outside the slot 135. It will thus be seen that this spring 134 when used with the large spool with the square opening tends to force the spool to the right as viewed in Fig. 12 and secures excellent contact between the opening and the spindle. When a spool with a small bore is placed on the spindle the spring 134 is depressed into its slot 135.

The user of spindles which are square in cross section must with existing constructions fit the square-sided spindle against the square sides of the spool openings. In using this invention however with a spool with a square opening, if the user places the spool in such relation to the spindle that the latch engages a corner instead of a side of the opening the spindle is still effective properly to drive the spindle.

Fig. 14 shows a spindle of square cross section 138 with a compensating latch 140 and a positioning spring 141. For purposes of illustration a spindle receiving opening 142 for a spool having a side plate 139 of a relatively small circular bore is shown in broken lines.

I claim:

1. In a spindle extending outwardly from a support and adapted for the removable and selective mounting over the end thereof relatively remote from said support of a plurality of different carriers each of different dimensions, a first stop relatively adjacent said support for limiting the inward movement of one of said carriers toward said support, a second stop disposed between said first stop and said end for limiting the inward movement of another of said carriers toward said support, and control means for selectively determining which of said stops is in movement-limiting position to a carrier, said control means including an operating formation so disposed that it is engaged and operated by said carrier as it is being moved inwardly upon said spindle.

2. In a spindle extending outwardly from a support and adapted for the removable and selective mounting over the end thereof relatively remote from said support of a plurality of different carriers each of different widths, means for selectively positioning each of said carriers at different points along the axis of said spindle so that the center of the material wound upon each of said carriers may coincide, said means comprising a plurality of different stops each selectively effective to limit the inward movement of each of said carriers at different points along the axis of said spindle from said end toward said support in accordance with the width thereof and control means operated by each of said carriers as it is being placed upon said spindle by such a movement for selectively rendering each of said stops operative upon said carrier in accordance with the width of said carrier.

3. In a spindle extending outwardly from a support and adapted for the removable and selective mounting over an end thereof relatively remote from said support of a plurality of differently dimensioned carriers, stop means mounted for revolution with said spindle and selectively movable relatively thereto between a first position wherein it has no effect upon the inward movement of a carrier along the axis of said spindle and a second position wherein it limits such movement, and means for moving said stop means between said positions, said moving means including an operating formation so disposed that it is engaged and operated by the carrier as it is being moved inwardly upon said spindle.

4. A spindle extending outwardly from a support and adapted for the selective and removable mounting over an end thereof relatively remote from said support of carriers of a plurality of different widths, said spindle including a mount portion extending along its axis, a fixed stop for limiting the inward movement of a carrier of one width along said mount portion, a movable stop disposed relatively closer to the end of the spindle over which the carrier is mounted for limiting the inward movement of a carrier of another width, and means operated by the inward movement of a carrier of said second width along said mount portion toward said support for operating said movable stop.

5. A revoluble spindle extending outwardly from a support and adapted for the removable mounting over an end thereof relatively remote from said support of carriers of different widths, said spindle including a mount portion extending along its axis, a relatively fixed stop disposed relatively remotely from the end of the spindle over which the carrier is mounted and revoluble therewith, a spring pressed stop member revoluble with said spindle and extensible to a position between said fixed stop and said end wherein it engages the leading side plate of a carrier which is being placed upon said carrier mount portion by an inward movement from said end of said spindle toward said support for limiting said inward movement, and means for driving said carrier by the revolution of said spindle.

6. A revoluble spindle extending outwardly from a support and adapted for the removable mounting over an end thereof relatively remote from said support of a carrier, said spindle including a mount portion extending along its axis, a relatively fixed stop disposed relatively adjacent said support and revoluble with said spindle, a spring pressed plunger mounted for revolution with said spindle and movable a substantial distance along an axis parallel to that of said spindle to a position between that of said relatively fixed stop and said end wherein it engages the leading side plate of a carrier which is being placed upon said carrier mount portion for limiting the movement of said carrier over said end of said spindle relatively remote from said support and toward said support, and means for driving said carrier by the revolution of said spindle.

7. A revoluble spindle extending from a support and adapted for the removable mounting over an end thereof relatively remote from said support of a carrier, said spindle including a mount portion extending along its axis, a relatively fixed stop disposed relatively adjacent said support and relatively remotely from the end of the spindle over which the carrier is mounted and revoluble with said spindle, a spring pressed plunger mounted for revolution with said spindle and movable a substantial distance along an axis parallel to that of said spindle to a relatively extended position between that of said relatively fixed stop and said end wherein it engages the leading side plate of a carrier which is being placed upon said carrier mount portion and limits such movement of said carrier toward said support, a detent for releasably holding said plunger in said relatively extended position and means for driving said carrier by the revolution of said spindle.

8. A revoluble spindle extending from a support and adapted for the removable mounting over an end thereof relatively remote from said support of a carrier, a spring urged stop plunger extensible a substantial distance in a direction substantially parallel to the axis of the spindle for engaging the leading side plate of a carrier which is mounted upon said spindle, a detent for holding said stop in its extended position, and means for driving said carrier by the revolution of said spindle.

9. A carrier-receiving spindle extending from a support, a spring urged driving plunger displaceable in a direction away from said support and substantially parallel to the axis of the spindle, a mounting for said plunger revoluble with said spindle, said plunger in its extended position being relatively remote from said support and adapted to enter an opening in a side plate of a relatively narrow carrier disposed upon said spindle in order to drive said carrier and to be forced back toward said support and out of operative position relatively to the side of said narrow carrier by the imperforate side plate of a relatively wide carrier when placed upon said spindle, and selectively operable means for positioning said narrow carrier at a point along the axis of said spindle at which said plunger may enter said opening to drive said carrier and for positioning said wide carrier at another point along said axis at which an imperforate side plate of said carrier forces said plunger to its inoperative or non-extended position.

10. In combination, a carrier-receiving revoluble spindle mounted upon a support and adapted for the removable mounting of a carrier over the end thereof relatively remote from said support, a plunger mounted for revolution with said spindle and spring pressed for movement in a direction substantially parallel to the axis of said spindle away from said support and toward said end and having a substantial range of movement, said plunger being compressible so that the head thereof is situated adjacent said support when a relatively wide carrier with an imperforate leading side plate is placed upon said spindle over said end thereof and moved adjacent said support and being extensible to a position relatively remote from said support and relatively adjacent said end and being adapted for engagement with a perforation in a side plate of a relatively narrow carrier when such a carrier is placed upon said spindle over said end thereof and moved toward said support a distance substantially less than that to which said wide carrier is moved, whereby the revolution of said plunger drives said narrow carrier, and means independent of said plunger for driving said relatively wide carrier.

11. A carrier-receiving spindle extending from a support and adapted for the selective and removable mounting over an end thereof relatively remote from said support of a plurality of carriers having different widths and spindle-receiving openings of different diameters, a spring urged plunger displaceable a substantial distance in a direction away from said support and substantially parallel to the axis of said spindle, a mounting for said plunger revoluble with said spindle, said plunger in its extended position being adapted to contact the side plate of a relatively narrow carrier placed upon said spindle at a central position along its axis relatively remote from said support and from said end and to be forced into a position relatively adjacent said support by the imperforate side plate of a relatively wide carrier as it is placed upon said spindle, and a spring pressed driving member extending along the axis of said spindle in a direction parallel thereto and mounted for revolution therewith, said driving member being movable by its spring pressure away from said axis and into engagement with the interior of the spindle-receiving opening of a carrier in which the diameter of such opening is relatively large and being movable against such spring pressure and toward said axis by contact with the interior of the spindle-receiving opening of a carrier having such an opening of relatively small diameter.

12. A spindle having a mounting for a carrier, said mounting including positioning means movable radially of the axis of the spindle for engaging the interior of spindle receiving openings of different cross sectional dimensions in different carriers, positioning means embodying a plurality of selectively effective stops for controlling the axial position of carriers of different widths along the axis of the spindle, and means operated by the placing of a carrier upon said spindle for operating both said radial and axial positioning means.

13. In combination, a spindle having a mounting for a carrier and positioning means embodying a plurality of selectively effective stops for controlling the position of carriers of different widths along the axis of said spindle, and means joined to said stops and mounted upon said spindle and engaging the interior of the spindle-receiving opening of a carrier and movable by contact therewith as it is being placed upon said spindle for operating said stops.

14. A spindle mounted upon a support and having a carrier mount portion adapted for the selective and removable mounting over the end thereof relatively remote from said support of different carriers having spindle-receiving openings of different diameters and having different widths, said mount portion including means radially movable from and to the axis of said spindle for successively engaging said spindle-receiving openings of different diameters and also having a plurality of selectively operable stops each successively effective at different points along said carrier mount portion for selectively positioning carriers of different widths along the axis of said mount portion between said support and said remote end in accordance with such width.

15. A spindle having a mounting for a carrier, said mounting including a single member movable radially of the axis of the spindle which embodies a plurality of carrier-contacting surfaces a first of which positions a carrier radially of the axis of the spindle and a second of which controls the axial position of the carrier in accordance with the position of the first surface radially of the axis of the spindle.

16. A carrier-receiving spindle, said spindle being formed with a slot cut therein parallel to its axis, a compensating member mounted in said slot for movement therein radially of said axis, spring means impelling said member away from said axis and into operative contact with the interior of the spindle-receiving opening of a carrier, and a stop member extending from said compensating member in a direction away from that in which said slot extends and normal to said axis, said spindle being provided with an opening in which said stop member is movable, the length of said stop member being such that when said compensating member is moved relatively far away from said axis by said spring means said stop member is contained within the cross sectional area of said spindle and does not limit the axial movement of a carrier along said spindle and that when said compensating member is moved toward and relatively close to said axis said stop member extends beyond said cross sectional area and limits such axial movement whereby a carrier with a bore of relatively large cross sectional area is not limited axially by said stop and one of relatively small cross sectional area is so limited.

17. A spindle having a mounting for a carrier, said mounting including a positioning member movable radially of the axis of the spindle for engaging the interior of spindle-receiving openings of carriers, said member being spring pressed away from the axis of said spindle and being movable against its spring pressure toward said axis, said member embodying a stop formation extending toward said axis and being of such dimensions that when said member is moved away from the axis of said spindle said stop formation is disposed within the cross sectional area of said spindle and hence is inoperative as a stop for a carrier as it is being mounted upon said mount portion, said dimensions being such that when said member is depressed toward said axis by engagement with the interior of the spindle-receiving opening of a carrier said stop member extends beyond said cross sectional area of said spindle and is effective to engage the leading side plate of a carrier and act as a stop therefor, said spindle being provided with an opening through which said stop formation may move.

18. In combination, a spindle mounted upon a support and extending therefrom and adapted for the selective mounting over an end thereof relatively remote from said support of carriers having different widths and a carrier mount portion revoluble with said spindle and placed substantially parallel to the axis thereof and movable from and toward the axis thereof, said carrier mount portion being formed with two projections a first of which extends in one direction relative to the axis of said support and a second of which extends in another direction from said mount through an opening in said spindle, said spindle being formed with such an opening, and is disposed at a point between that at which said first stop formation is disposed and said end of said spindle, said second stop formation being of such dimensions that when said mount portion is disposed relatively near the axis of said spindle said second formation projects beyond the cross sectional area of said spindle but when said mounting member is disposed relatively far from the axis of said spindle said second projection is embraced entirely within the cross sectional area of said spindle.

19. In a carrier-receiving spindle extending from a support, a plurality of different seats for positioning carriers of different widths disposed at different points along the axis of the spindle and a signalling member which by contact with the advancing side of a carrier which is being placed upon said spindle over an end thereof is effective to indicate to the operator when he has placed a carrier in the first of said seats, said signalling member being displaceable by the carrier so that the operator can readily move the carrier along said axis into another of said seats.

20. A carrier-receiving spindle, said carrier being formed with a slot cut therein parallel to its axis, a carrier-positioning latch member mounted in said slot for engaging the bore of a carrier for positioning it upon said spindle, the forwardly-facing end of said member being formed with a forwardly-facing surface inclined toward the surface of the spindle to expedite the slipping of the carrier over said member as the carrier is being mounted upon said spindle, a single spring supporting said member in said slot substantially midway of the length of said member so that it freely rocks upon said spring as a pivot, and studs held in over-sized slots formed in said spindle for retaining said latch member therein while permitting relatively free rocking movement thereof.

WARREN DUNHAM FOSTER.